(12) United States Patent
Adelman et al.

(10) Patent No.: US 6,964,157 B2
(45) Date of Patent: Nov. 15, 2005

(54) EXHAUST EMISSION CONTROL SYSTEM AND METHOD FOR REMOVAL AND STORAGE OF VEHICLE EXHAUST GAS NITROGEN OXIDES DURING COLD OPERATION

(75) Inventors: Brad Adelman, Deerfield, IL (US); Per Gösta Edvin Andersson, Downers Grove, IL (US)

(73) Assignee: Ricardo, Inc, Van Buren Township, MI (US)

( * ) Notice: Subject to any disclaimer, the term of this patent is extended or adjusted under 35 U.S.C. 154(b) by 0 days.

(21) Appl. No.: 10/109,164

(22) Filed: Mar. 28, 2002

(65) Prior Publication Data

US 2003/0182933 A1 Oct. 2, 2003

(51) Int. Cl.[7] ............................................. F02M 25/06
(52) U.S. Cl. ........................... 60/278; 60/274; 60/285; 60/301
(58) Field of Search .................... 60/285, 300, 301, 60/299, 274, 278; 123/198 F, 481

(56) References Cited

U.S. PATENT DOCUMENTS

| | | | | |
|---|---|---|---|---|
| 5,270,024 A | * | 12/1993 | Kasahara et al. | 423/213.2 |
| 5,722,236 A | * | 3/1998 | Cullen et al. | 60/274 |
| 5,753,192 A | * | 5/1998 | Dobson et al. | 422/177 |
| 5,878,567 A | | 3/1999 | Adamczyk, Jr. et al. | |
| 5,968,463 A | | 10/1999 | Shelef et al. | |
| 6,112,518 A | | 9/2000 | Jerger et al. | |
| 6,199,373 B1 | * | 3/2001 | Hepburn et al. | 60/274 |
| 6,257,214 B1 | | 7/2001 | Bidner et al. | |
| 6,296,813 B1 | | 10/2001 | Ishii et al. | |
| 6,345,500 B2 | * | 2/2002 | Itou et al. | 60/286 |
| 6,354,079 B1 | * | 3/2002 | Choi et al. | 60/286 |

FOREIGN PATENT DOCUMENTS

| | | | | |
|---|---|---|---|---|
| DE | 100 15 292 | | 10/2001 | |
| EP | 0 580 389 | | 1/1994 | |
| EP | 0 666 103 | | 8/1995 | |
| EP | 0 829 623 | | 3/1998 | |
| EP | 1 078 678 | | 2/2001 | |
| GB | 2329260 A | * | 3/1999 | ............. F01N 3/08 |
| WO | WO 98/45586 | | 10/1998 | |

* cited by examiner

Primary Examiner—Henry C. Yuen
Assistant Examiner—Diem Tran
(74) Attorney, Agent, or Firm—William J. Clemens

(57) ABSTRACT

A system and a method for removing $NO_x$ from an internal combustion engine exhaust stream at lower temperatures, and releasing the $NO_x$ back into the exhaust stream at higher temperatures, includes an occluder with an adsorbent able to selectively adsorb $NO_x$ at temperatures below a predetermined temperature and desorb $NO_x$ at temperatures above the predetermined temperature. The system includes an engine control module that operates the engine during cold operation so as to produce an increased ratio of $NO_2/NO$.

21 Claims, 3 Drawing Sheets

EXHAUST EMISSION CONTROL SYSTEM AND METHOD FOR REMOVAL AND STORAGE OF VEHICLE EXHAUST GAS NITROGEN OXIDES DURING COLD OPERATION

FIELD OF THE INVENTION

The present invention relates generally to an apparatus and a method for the removal and storage of vehicle exhaust nitrogen oxides during cold operation. More particularly, the invention is directed to the use of a zeolite for occluding nitrogen oxides from the exhaust of a vehicle during cold operation, which nitrogen oxides are later released by the zeolite for subsequent processing by a catalytic converter as the vehicle engine warms.

BACKGROUND OF THE INVENTION

The operation of an internal combustion engine, such as an automotive vehicle engine, creates many gaseous exhaust byproducts. Included in these byproducts are pollutants such as unburned hydrocarbon, carbon dioxide, carbon monoxide, and various nitrogen-oxygen compounds, which are known in the art as $NO_x$. $NO_x$, as it is found in the exhaust of an internal combustion engine, primarily consists of nitrogen oxide (NO) and nitrogen dioxide ($NO_2$). $NO_x$ is a pollutant that can cause many problems including, but not limited to, eye, nose, and throat irritation. $NO_x$ may also combine with water to produce acids that are a component of acid precipitation. Modern automotive vehicles are fitted with an engine exhaust treatment system to alleviate these problems and comply with environmental regulations.

Often, an engine exhaust treatment system will include an adsorbent for taking up unburned hydrocarbon from the exhaust. The adsorbent is disposed in the exhaust piping that leads away from the engine. The adsorbent attracts the unburned hydrocarbon and accumulates it in the interstitial spaces on the surfaces of the adsorbent. The adsorbent physically occludes the unburned hydrocarbon until the oxidation function of a subsequent catalytic converter has reached its light-off temperature, at which point the adsorbent also attains an elevated temperature at which it releases the unburned hydrocarbon for transport to the downstream catalytic converter. The catalytic converter thereafter oxidizes and converts the unburned hydrocarbon in the exhaust gas into non-polluting gases.

A common type of catalytic converter is known in the art as a lean $NO_x$ trap (LNT). As the name implies, the LNT converts $NO_x$ to a nonpolluting gas. The LNT, however, functions at a high efficiency and removes the greatest amount of $NO_x$ only after it has reached a critical light-off temperature, above about 200 degrees Celsius. In the case of an automobile started in a location having low ambient temperatures, it can take several minutes for the LNT to reach this critical light-off temperature, during which time the $NO_x$ disadvantageously escapes to the atmosphere. In this case, over 50% of all $NO_x$ tailpipe emissions produced during a drive cycle can occur during the time it takes the LNT to reach 200 degrees Celsius.

It would be desirable to provide apparatus for reducing the amount of $NO_x$ escaping to the atmosphere during cold operation of an internal combustion engine, when the LNT or other $NO_x$ removal technology is below about 200 degrees Celsius.

SUMMARY OF THE INVENTION

The present invention concerns a system for controlling vehicle exhaust gas nitrogen oxides emissions during cold operation. The system includes a control for changing the $NO_2/NO$ ratio, an occluder for storing and releasing $NO_x$ and a catalytic converter for $NO_x$ reduction. The control can increase the $NO_2/NO$ ratio utilizing techniques such as the exhaust gas recirculation (EGR) valve, cylinder deactivation, an oxidation catalyst, a nonthermal plasma, etc. The occluder can be a zeolite based adsorber and the catalytic converter can be any suitable device such as a LNT, SCR (selective catalytic reduction with N-based reductants), $deNO_x$ catalysts (either passive or with active HC injections), etc. The system integrates selected characteristics of the control, the occluder and the catalytic converter to achieve significant $NO_x$ reduction during cold operation of a vehicle.

Accordant with the present invention, an apparatus for removing $NO_x$ from an internal combustion engine exhaust stream at low temperatures, and releasing said $NO_x$ back into said exhaust stream at high temperatures, has surprisingly been discovered. It comprises: an adsorber housing, having an inlet and an outlet, said inlet in communication with the exhaust stream of an internal combustion engine, and said outlet in communication with an internal combustion engine catalytic converter; and adsorbent disposed in the interior of said housing, said adsorbent able to adsorb selectively $NO_x$ at temperatures below a predetermined desired high efficiency temperature (preferably about 200 degrees Celsius), and said adsorbent able to desorb $NO_x$ at temperatures above the predetermined temperature. The catalytic converter can be positioned in the adsorber housing or in a separate housing. While a temperature of about 200 degrees Celsius is used herein as an example, the present invention is not limited to that approximate temperature. The upper temperature range for zeolites to hold $NO_x$ is about 170–200 degrees Celsius and several catalyst materials will light off in that range. However, by matching the release temperature characteristic of the occluder material and with the light off temperature characteristic of the catalyst material, any of various predetermined high efficiency temperatures can be selected for operation.

The inventive apparatus is particularly useful for removing $NO_x$ from an internal combustion engine exhaust stream and storing same during cold operation of an engine, and then re-injecting said $NO_x$ back into the exhaust stream at catalytic converter operating temperatures. The engine control module (ECM) receives sensor signals from a plurality of sensors that provide information about the operating conditions of the engine and the emission control system. For example, the sensors can include a mass air flow sensor (MAF), an intake manifold absolute pressure sensor (MAP), a throttle position sensor (TPS), a vehicle speed sensor (VSS), an engine RPM sensor (RPM), a temperature of coolant sensor (TMP), a heated exhaust gas oxygen sensor (HEGO), an exhaust gas temperature sensor (EGT) and a catalyst monitoring sensor (CMS). Based upon the signals from the sensors, the ECM can control the exhaust gas recirculation (EGR) valve and the fuel control to cause the engine to operate during cold operation to emit exhaust gases having an increased ratio of $NO_2/NO$ until the LNT has reached the lightoff temperature.

DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENT

Figure 1:
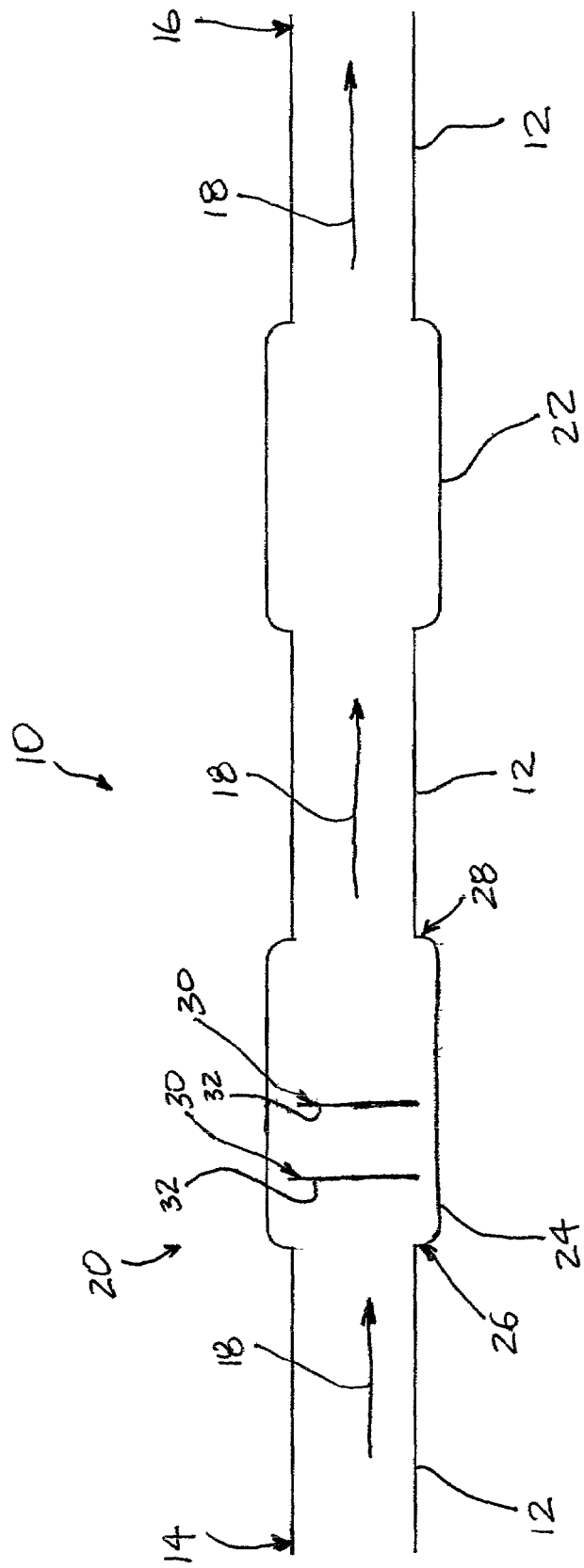
FIG. 1 is a schematic view of an apparatus for treating exhaust gas flowing from an internal combustion engine, in accordance with the present invention.

The present invention is directed to apparatus for removing $NO_x$ from an internal combustion engine exhaust stream at low temperatures, and releasing said $NO_x$ back into said exhaust stream at high temperatures, comprising: a housing having an inlet and an outlet, said inlet in communication with the exhaust stream of an internal combustion engine and said outlet in communication with an internal combustion engine catalytic converter; and adsorbent disposed in the interior of said housing, said adsorbent able to selectively adsorb $NO_x$ at temperatures below a high efficiency temperature, preferably about 200 degrees Celsius, and said adsorbent able to desorb $NO_x$ at temperatures above the high efficiency temperature.

The adsorbent according to the present invention comprises a zeolite, which is a crystalline inorganic polymer based on an infinitely-extending tetrahedral framework of aluminum and silicon oxides. The tetrahedral framework contains channels or interconnecting interstitial pathways that are occupied by cations. $NO_x$ occlusion and storage is enhanced according to the present invention when the silicon-to-aluminum ratio is low.

It has been observed that zeolites containing exchanged divalent alkaline-earth metal cations such as $Ca^{2+}$ are able to store then release $NO_x$ molecules at temperatures below then above, respectively, about 200 degrees Celsius. The exchange cations useful for the practice of the present invention include hydrogen, alkali metal, alkaline earth metal, and transition metal ions. Alkaline-earth metals, from which preferred cations are prepared, include calcium, barium, strontium, and radium. Useful natural zeolites may include chabazite, erionite, and faujasite, while useful synthetic zeolites include A, X, and Y zeolites. A preferred adsorbent is calcium exchanged Y zeolite. The inventive adsorbent system operates best at a nitrogen-dioxide-to-nitrogen-oxide ratio greater than or equal to about one, based on the formation of an ion pair ($NO^+NO_2$) which interacts with the ionic network of the zeolite.

The present invention provides apparatus adapted to be installed in the piping of an exhaust system, typically upstream of a catalytic converter such as for example a lean $NO_x$ trap (LNT), for treating the exhaust gas flowing from the discharge of an internal combustion engine. The exhaust gas from a conventional internal combustion engine includes amounts of nitrogen dioxide and nitrogen oxide entrained therein that are lower than the preferred nitrogen-dioxide-to-nitrogen-oxide ratio stated above.

In operation, when the exhaust gas enters the inlet of the housing, and the adsorbent is below a temperature of about 200 degrees Celsius, the interstices on the adsorbent attract and occlude the $NO_x$ from the exhaust gas stream. Thus, the adsorbent effects bulk separation of $NO_x$ from the exhaust gas stream. As the adsorbent is heated to a temperature above about 200 degrees Celsius by the warming of the internal combustion engine exhaust gas stream, the adsorbent desorbs the $NO_x$ stored in the interstices of the adsorbent, thereby releasing the $NO_x$ for subsequent conversion to innocuous products by a downstream catalytic converter. Thus, the adsorbent undergoes thermal cycling of the adsorption-desorption process each time the internal combustion is activated from cold operation.

Referring now to FIG. 1, an exhaust system, for example for an internal combustion engine, is indicated generally at 10. The exhaust system 10 includes an exhaust source (not shown), such as a gasoline or diesel engine that provides exhaust gas (not shown), to an upstream end 14 of an exhaust pipe 12. The exhaust gas flows within the exhaust pipe 12 in a gas flow path indicated by an arrow 18 from the upstream end 14 of the exhaust pipe 12 to a downstream end 16 of the exhaust pipe 12.

Apparatus according to the present invention is indicated generally at 20 and is connected to the exhaust pipe 12 intermediate the upstream end 14 of the exhaust pipe 12 and a catalytic converter, such as for example, a lean $NO_x$ trap (LNT) 22. Apparatus 20 includes a housing 24 having an inlet end 26 and an outlet end 28. At least one adsorbent 30 having an adsorption surface 32 in the flow path 18 of the exhaust gas is disposed in the interior of the housing 24.

In operation, when the exhaust gas enters the inlet of the housing and the adsorbent 30 is below a temperature of about 200 degrees Celsius, the adsorbent 30 removes and stores the $NO_x$ in the exhaust gas when the exhaust gas contacts the adsorption surface 32. When the adsorbent 30 is heated above about 200 degrees Celsius, the adsorbent 30 releases the $NO_x$ to the LNT 22.

Figure 2:
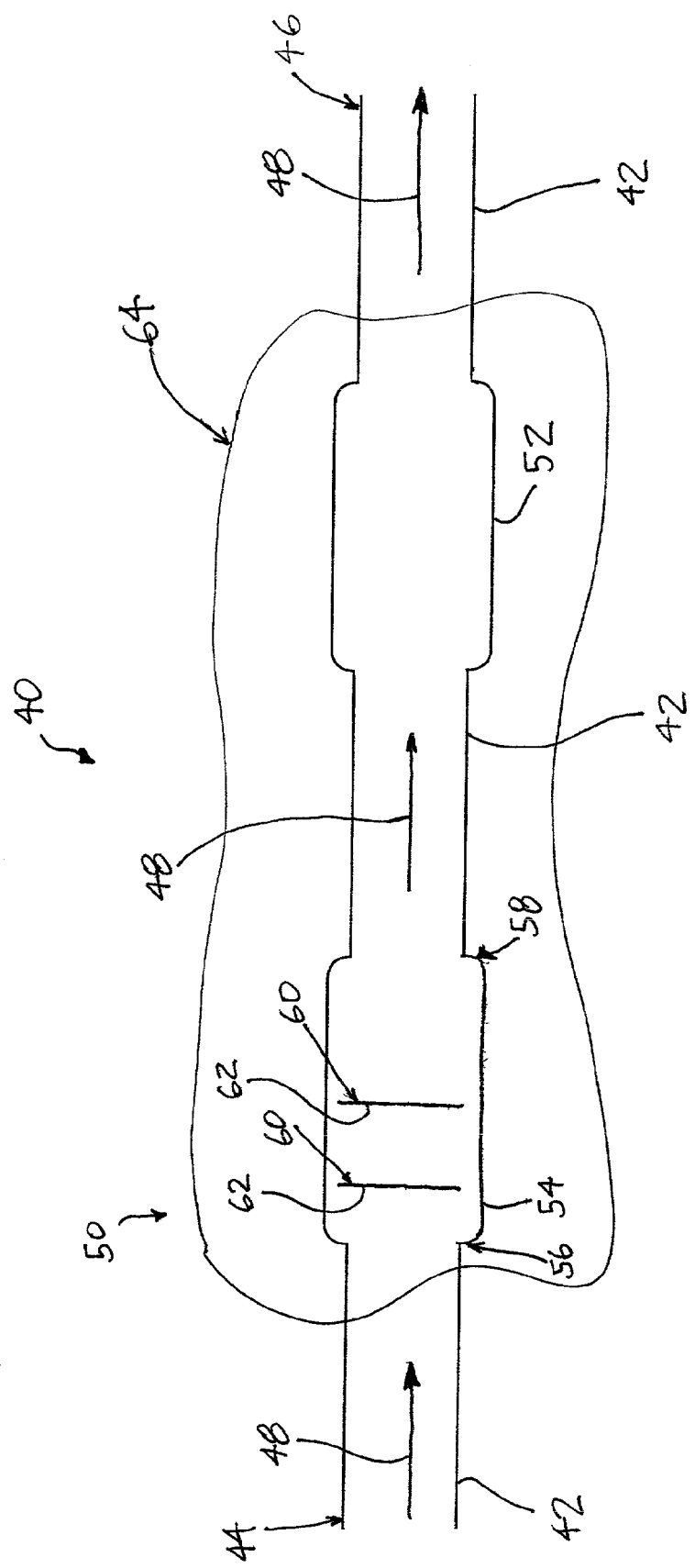
FIG. 2 is schematic view of an alternative embodiment of the apparatus for treating exhaust gas flowing in a flow path from an internal combustion engine.

Referring now to FIG. 2, an exhaust system, for example for an internal combustion engine, is indicated generally at 40. The exhaust system 40 includes an exhaust source (not shown), such as a gasoline or diesel engine that provides exhaust gas (not shown), to an upstream end 44 of an exhaust pipe 42. The exhaust gas flows within the exhaust pipe 42 in a gas flow path indicated by an arrow 48 from the upstream end 44 of the exhaust pipe 42 to a downstream end 46 of the exhaust pipe 42.

An alternative embodiment of the apparatus according to the present invention is indicated generally at 50 and is connected to the exhaust pipe 42 intermediate the upstream end 44 of the exhaust pipe 42 and a catalytic converter, such as for example, a lean $NO_x$ trap (LNT) 52. Apparatus 50 includes an adsorbent housing 54 having an inlet end 56 and an outlet end 58. The adsorbent housing 54 and the LNT 52 are enclosed within a common housing 64. At least one adsorbent 60 having an adsorption surface 62 in the flow path 48 of the exhaust gas is disposed in the interior of the housing 54.

In operation, when the exhaust gas enters the inlet of the housing and the adsorbent 60 is below a temperature of about 200 degrees Celsius, the adsorbent 60 removes and stores the $NO_x$ when the exhaust gas contacts the adsorption surface 62. When the adsorbent 60 is above about 200 degrees Celsius, the adsorbent 60 releases the $NO_x$ to the LNT 52.

Figure 3:
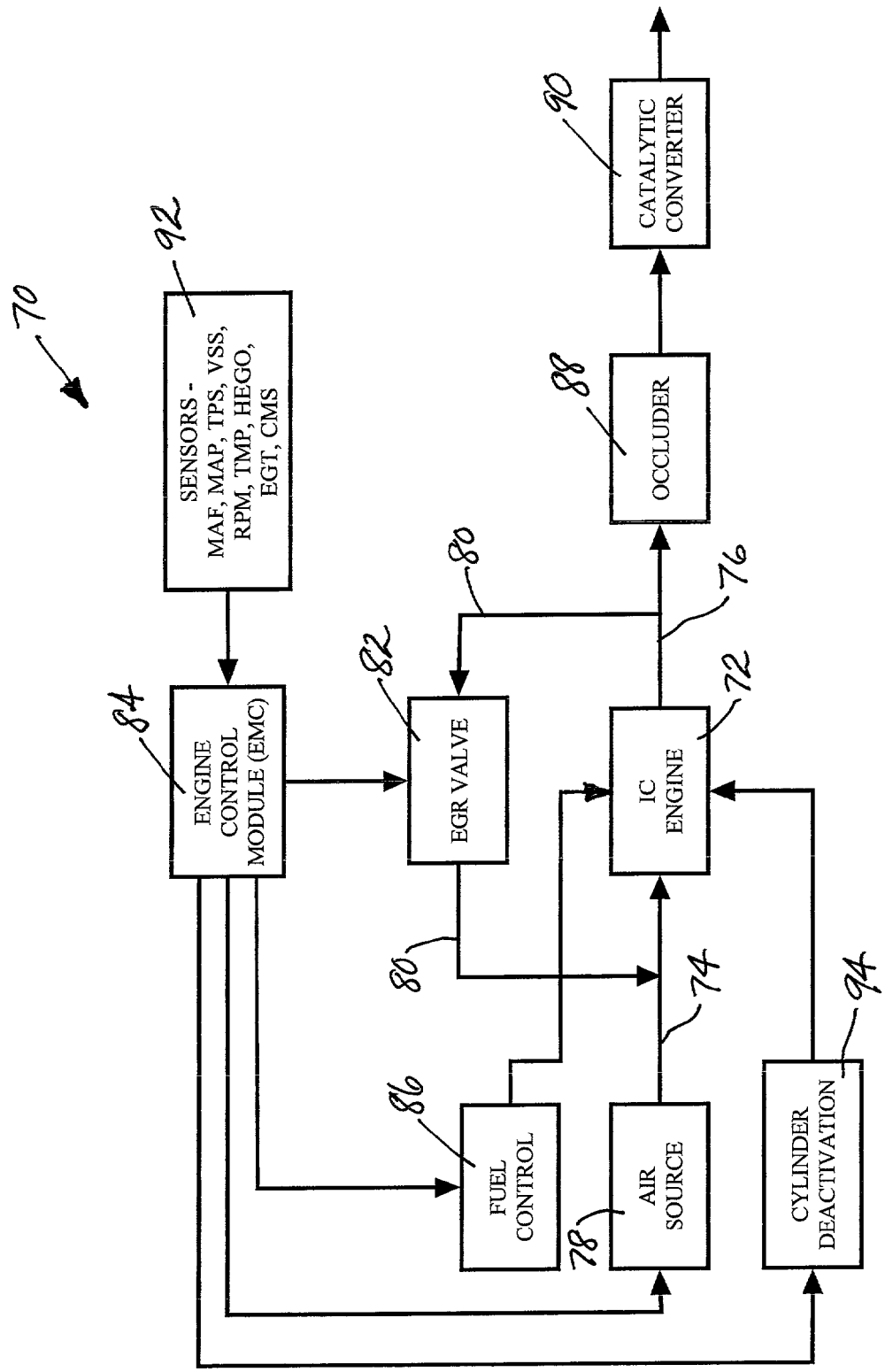
FIG. 3 is a block diagram of an engine emission control system in accordance with the present invention.

There is shown in FIG. 3 an engine emission control system 70 according to the present invention. An internal combustion engine 72 is provided with an intake manifold 74 and an exhaust manifold 76. A throttle (not shown)

controls the amount of fresh air admitted to the engine 72 from an air source 78 such as the atmosphere. A small portion of the exhaust gas flowing out of the engine 72 through the exhaust manifold 76 is returned to the intake manifold 74 through a passage 80 connected between the manifolds. The amount of the exhaust gas recirculated is controlled by adjusting an exhaust gas recirculation (EGR) valve 82. The valve 82 responds to a control signal from an engine control module (ECM) 84 connected to the valve. The ECM 84 also is connected to a fuel control 86 to generate a control signal to determine the amount of fuel delivered to the engine 72.

The exhaust manifold 76 is connected to an inlet of an occluder 88, such as one of the absorbers 30 and 60 described above. An outlet of the occluder 88 is connected to an inlet of a catalytic converter 90, such as the lean $NO_x$ traps 22 and 52 described above or any other suitable device. The EMC 84 receives sensor signals from a plurality of sensors 92 that provide information about the operating conditions of the engine 72 and the emission control system 70. For example, the sensors 92 can include a mass air flow sensor (MAF), an intake manifold absolute pressure sensor (MAP), a throttle position sensor (TPS), a vehicle speed sensor (VSS), an engine RPM sensor (RPM), a temperature of coolant sensor (TMP), a heated exhaust gas oxygen sensor (HEGO), an exhaust gas temperature sensor (EGT) and a catalyst monitoring sensor (CMS). Typically, the HEGO sensor is located in the exhaust gas stream upstream of the inlet to the converter 90, the EGT sensor is located in the converter, and the CMS is located downstream of the outlet from the converter. Based upon the signals from the sensors 92, the ECM 84 can control the EGR valve 82 and the fuel control 86 to cause the engine to operate during cold operation to emit exhaust gases having an increased ratio of $NO_2/NO$ until the converter 90 has reached the lightoff temperature.

The thermal management capabilities of the system according to the present invention are particularly advantageous in two scenarios. In one scenario, the zeolite material in the occluder 88 becomes filled with $NO_x$ before the light off temperature of the converter 90 is reached so that no more $NO_x$ can be removed from the exhaust gas. In the other scenario, as the system 70 ages, the desorption temperature of the zeolite material in the occluder 88 will decrease while the light off temperature of the catalyst in the converter 90 will increase. This second scenario creates a temperature region where the $NO_x$ is no longer held but the catalyst has not yet reached light off. In both of these scenarios, the operation of the engine 72 can be managed to create a rapid temperature rise in the exhaust gas to minimize the amount of $NO_x$ that will pass through the catalytic converter 90. For example, the EMC 84 is connected to a cylinder deactivation device 94 associated with the engine 72 to typically disable one or more intake valves thereby causing the remaining cylinders to work harder and speed the temperature rise in the exhaust gas.

In summary, the system 70 according to the present invention integrates a control, an occluder and a catalytic converter to reduce nitrogen oxides emissions during cold operation of vehicle engines. The control 84 utilizes engine management technology to increase the $NO_2/NO$ ratio of the exhaust gas exiting the engine. One method of ratio control is utilization of the EGR valve 82. Another method of ratio control is utilization of the cylinder deactivation device 94. Yet other methods of ratio control can involve utilization of the ECM 84 to adjust the fuel control 86 and/or the air source 78 or insert an additive such as an oxidation catalyst or a nonthermal plasma. The zeolite based occluder 88 holds the $NO_x$ below a predetermined temperature and releases the NOx above the predetermined temperature. The catalytic converter 90 lights off at or below the predetermined temperature to reduce the NOx and can be a LNT, SCR or active deNOx catalyst.

The $NO_2/NO$ ratio is not required to be equal to or greater than one. As the exhaust gas exits the engine 72, the NO fraction is the dominant NOx species. Any increase in the $NO_2$ content will increase the zeolite occluder 88 efficiency. A calcium exchanged Y type zeolite will have optimum efficiency when the $NO_2/NO$ ratio is unity. However, the system 70 will operate at ratios above and below unity. Any time that the catalytic converter 90 falls below the light off temperature, the system 70 will work if the occluder 88 temperature is below its NOx desorption temperature.

In accordance with the provisions of the patent statutes, the present invention has been described in what is considered to represent its preferred embodiment. However, it should be noted that the invention can be practiced otherwise than as specifically illustrated and described without departing from its spirit or scope. For example, the present invention could be embodied as a separate vessel within the exhaust system of an internal combustion engine, or as a part of the same housing for an LNT.

What is claimed is:

1. A system for temporarily removing NOx from an internal combustion engine exhaust stream at a lower temperature, and releasing the NOx back into the exhaust stream at a higher temperature, comprising:
   an EGR valve for regulating a flow rate of exhaust gas recirculated to the engine from the exhaust system;
   an engine control module having an input and being adapted to be connected to an internal combustion engine, said module for changing the flow rate through the EGR valve, thereby increasing a ratio of $NO_2/NO$ in an exhaust stream of the engine in response to receiving at said input a signal representing a temperature of the exhaust stream and a signal representing a concentration of oxygen in the exhaust stream entering a catalytic converter;
   an occluder having an inlet adapted to be in communication with the exhaust stream of the engine and an outlet, the occluder including an adsorbent able to selectively adsorb NOx at temperatures below a predetermined temperature and able to desorb NOx at temperatures above the predetermined temperature;
   said catalytic converter connected to said occluder outlet;
   a temperature sensor producing said signal representing a temperature of the exhaust stream; and
   a sensor disposed downstream of said occluder outlet for generating said signal representing an oxygen concentration entering said catalytic converter indicating a loss of adsorption effectiveness of said occluder.

2. The system according to claim 1 wherein said adsorbent comprises a zeolite, including exchanged cations of hydrogen, alkali metals, alkaline earth metals, or transition metals.

3. The system according to claim 1 wherein said adsorbent comprises a zeolite, including exchanged cations of alkaline earth metals.

4. The system according to claim 1 wherein said adsorbent comprises a zeolite, including exchanged cations of calcium.

5. The system according to claim 1 wherein said adsorbent comprises chabazite, erionite, faujasite, synthetic A zeolite, synthetic X zeolite, or synthetic Y zeolite.

6. The system according to claim 1 wherein said adsorbent comprises calcium exchanged synthetic Y zeolite.

7. The system according to claim 1 wherein said catalytic converter is one of an LNT, an SCR and an active deNOx catalyst.

8. The system according to claim 1 further comprising a cylinder deactivation device operatively connected to the engine control module, and wherein the engine control module further controls operation of the engine:
   to disable an engine intake valve when the temperature sensor indicates that the temperature of the exhaust gas is less than the light off temperature; and
   to reenable the disabled intake valve when the temperature sensor indicates that the temperature of the exhaust gas is greater than the light off temperature.

9. A system for controlling exhaust gas emissions produced by an internal combustion engine and carried through an exhaust system, comprising:
   an exhaust manifold for carrying exhaust gas from the engine;
   a catalytic converter located in the exhaust system downstream from the exhaust manifold;
   a housing including an inlet communicating with the exhaust manifold, an outlet communicating with the catalytic converter, and an occluder located in the housing between the inlet and outlet, and containing adsorbent that adsorbs NOx at temperatures below a predetermined temperature and desorbs NOx at temperatures above the predetermined temperature;
   a first sensor that produces a first input signal representing at temperature of the exhaust gas;
   a second sensor that produces a second input signal representing the oxygen content of exhaust gas that has passed through the housing;
   an EGR valve for regulating a flow rate of exhaust gas recirculated to the engine from the exhaust system;
   a throttle for controlling air admitted to the engine;
   a fuel control for controlling fuel delivered to the engine; and
   an engine control module operatively connected to the first and second sensors, the EGR valve, the throttle and the fuel control for controlling operation of the engine by changing an air/fuel ration delivered to the engine and the flow rate through the EGR valve:
      to increase a ratio of $NO_2/NO$ in the exhaust gas in response to the first signal indicating that the temperature of the exhaust gas is less than a light off temperature of the catalytic converter and the second signal indicating a loss of adsorption effectiveness of said occluder; and
      to decrease the ratio of $NO_2/NO$ in the exhaust gas in response to the first signal indicating that the temperature of the exhaust stream is greater that the light off temperature.

10. The system according to claim 9 wherein said adsorbent comprises a zeolite, including exchanged cations of hydrogen, alkali metals, alkaline earth metals, or transition metals.

11. The system according to claim 9 wherein said adsorbent comprises a zeolite, including exchanged cations of alkaline earth metals.

12. The system according to claim 9 wherein said adsorbent comprises a zeolite, including exchanged cations of calcium.

13. The system according to claim 9 wherein said adsorbent comprises calcium exchanged synthetic Y zeolite.

14. The system according to claim 9 wherein said catalytic converter is located within said housing hydrodynamically downstream from said adsorbent in communication with said outlet.

15. The apparatus according to claim 9 wherein said catalytic converter is one of an LNT, an SCR and an active deNOx catalyst.

16. The system according to claim 9 wherein said adsorbent comprises chabazite, erionite, faujasite, synthetic A zeolite, synthetic X zeolite, or synthetic Y zeolite.

17. The system according to claim 16 wherein said adsorbent comprises calcium exchange synthetic Y zeolite.

18. The system according to claim 9 further comprising a cylinder deactivation device operatively connected to the engine control module, and wherein the engine control module further controls operation of the engine:
   to disable an engine intake valve when the first signal indicates that the temperature of the exhaust gas is less than the light off temperature; and
   to reenable the disabled intake valve when the first signal indicates that the temperature of the exhaust gas is greater than the light off temperature.

19. A method for removing NOx from an internal combustion engine exhaust stream at temperatures below a predetermined temperature, and releasing the NOx back into the exhaust stream at temperatures above the predetermined temperature, comprising the steps of:
   a. passing the exhaust stream through an occluder having an adsorbent able to selectively adsorb NOx at temperatures below the predetermined temperature and to desorb NOx at temperatures above the predetermined temperature;
   b. sensing the temperature of the exhaust stream and simultaneously sensing the concentration of oxygen in the exhaust stream exiting the occluder and entering a catalytic converter; and
   c. controlling the engine to produce an increased ratio of $NO_2/NO$ in the exhaust stream by changing the flow rate through an EGR valve and by changing the air-fuel ratio admitted to the engine when the sensed temperature is below the catalytic converter light off temperature and the sensed concentration of oxygen indicates a loss of adsorption effectiveness of said occluder.

20. The method according to claim 19 wherein the sensed concentration of oxygen indicates that the adsorbent is $NO_x$ because the adsorbent is saturated with $NO_x$.

21. The method according to claim 19, further comprising:
   d. disabling an engine intake valve when the temperature of the exhaust stream is less than the light off temperature; and
   e. reenabling the disabled intake valve when the temperature of the exhaust stream gas increases to the light off temperature.

* * * * *